No. 728,109. PATENTED MAY 12, 1903.
J. W. H. JAMES.
FURNACE FOR OXIDIZING METALS.
APPLICATION FILED MAY 21, 1902.
NO MODEL.

Witnesses:—

Inventor:
John W. H. James,
by his Attorneys,

No. 728,109. Patented May 12, 1903

UNITED STATES PATENT OFFICE.

JOHN W. H. JAMES, OF PHILADELPHIA, PENNSYLVANIA.

FURNACE FOR OXIDIZING METALS.

SPECIFICATION forming part of Letters Patent No. 728,109, dated May 12, 1903.

Application filed May 21, 1902. Serial No. 108,388. (No model.)

*To all whom it may concern:*

Be it known that I, JOHN W. H. JAMES, a subject of the King of Great Britain and Ireland, and a resident of Philadelphia, Pennsylvania, have invented certain Improvements in Furnaces for Oxidizing Metals, of which the following is a specification.

The object of my invention is to so construct an apparatus for effecting the oxidation of metals that the operation will be very rapidly effected and will be of an automatic character, the labor cost being thereby reduced to a minimum.

Figure 1:
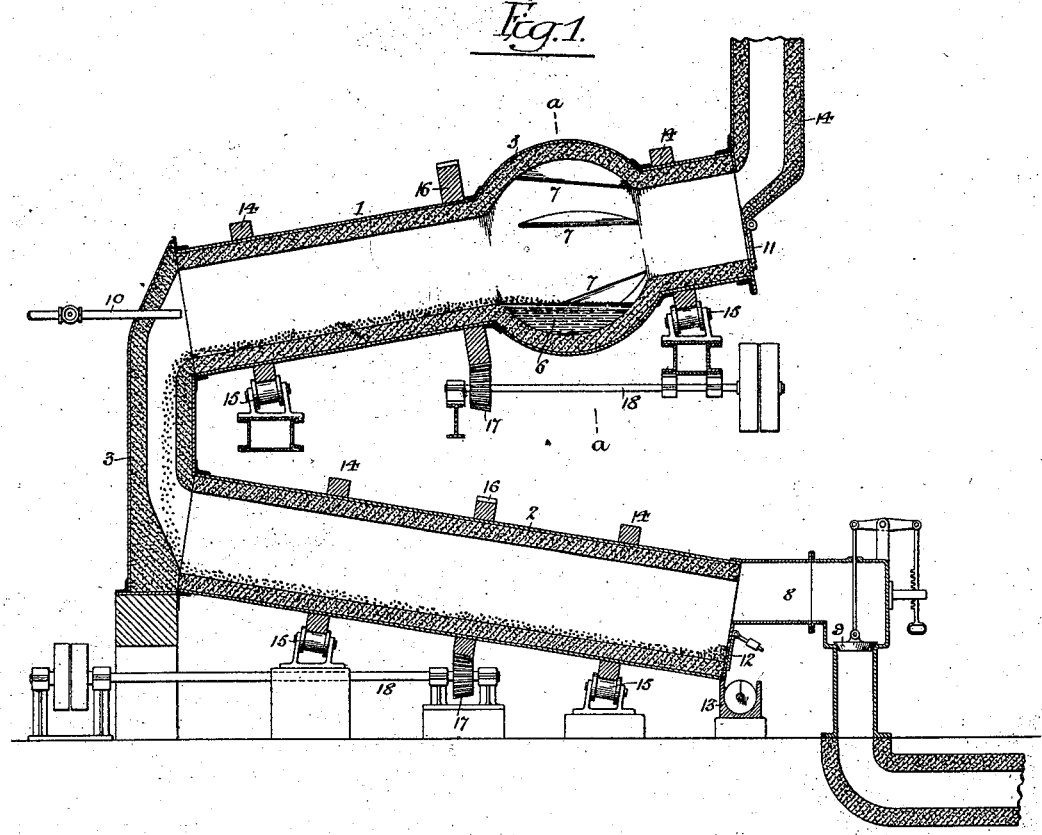
Figure 2:
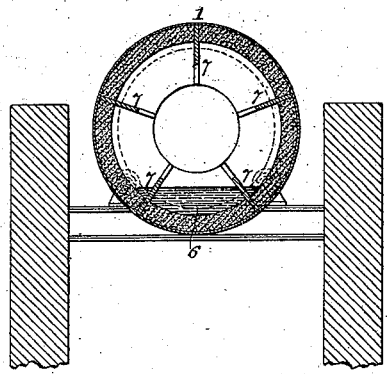

In the accompanying drawings, Figure 1 is a longitudinal section of oxidizing apparatus constructed in accordance with my invention, and Fig. 2 is a transverse section of part of the same on the line *a a*, Fig. 1.

My invention relates to oxidizing apparatus of that type in which the oxidizing agent acts upon the molten metal while the same is being splashed or sprayed so as to present the greatest possible amount of surface to said oxidizing agent, the purpose of my invention being to render the apparatus continuous and automatic in action and capable of rapidly and effectively reducing the metal to oxid.

The apparatus, as shown in Fig. 1, comprises two cylindrical furnaces 1 and 2, inclined in opposite directions and so mounted as to be free to turn around their inclined axes, the lower end of the upper furnace and the upper end of the lower furnace being connected by a vertical flue structure 3, so that a continuous passage through the furnaces is provided, the upper end of the upper furnace communicating with a discharge-stack 14. Both of the furnaces, the fuel structure and the stack, are preferably composed of outer metallic shells lined with fire-brick or other refractory material, and both furnaces are of cylindrical form; but the upper furnace has formed upon it a spheroidal enlargement 5, forming an inner pool 6, in which the molten metal accumulates, this spheroidal portion of the furnace having inwardly-projecting blades or wings 7, which as the furnace is rotated lift portions of the molten metal from the pool and gradually pour it back into the same, these fine streams of molten metal being thereby subjected to the action of the oxidizing agent traveling through the furnace.

Any desired means of heating the furnace and introducing the oxidizing agent into the same may be adopted; but I prefer to heat the furnace internally by introducing the combustible gas into the lower end of the furnace 2 through a flue structure 8, communicating therewith and having a suitable valve 9, whereby the flow can be readily controlled.

The heating-flame may itself be of such a character as to effect the desired oxidation of the metal, or such action may be effected or assisted by air introduced into the lower end of the upper furnace 1 through a valved pipe 10, communicating with any available supply of air under pressure.

Fresh supplies of metal may be introduced into the upper end of the furnace 1 through a valved opening 11, so as to constantly maintain the supply of molten metal in the pool 6, the oxid as it is formed traveling down the inclined bottom of the upper furnace 1 and falling thence through the flue structure 3 onto the inclined bottom of the lower furnace 2 and being thoroughly dried in its passage through the latter, the long travel of the oxid through the furnace also providing for the oxidation of any particles of metallic lead which may escape with the oxid from the surface of the pool 6.

A weighted valve 12 at the lower end of the furnace 2 provides for the discharge therefrom at intervals of accumulations of oxid, the same falling into the conveyer 13, whereby they are carried to the point at which they are to be used or are to receive further treatment.

It will be evident that the operation as described is purely automatic and insures such a thorough subjection of the molten metal to the action of the oxidizing agent as to effect rapid oxidation of the same. Hence the apparatus will in proportion to its size have a large capacity, and the labor cost will be reduced to a minimum.

Any desired means of mounting and rotating the furnaces may be adopted. In the present instance I have shown each furnace as provided with annular rails 14, mounted upon supporting-rolls 15, each furnace also having an annular rack 16, which meshes with a bevel-pinion 17 on a driving-shaft 18.

While I prefer to employ two furnaces, located one above the other, as described, a single furnace only may be used in some cases, such furnace being similar to the upper furnace 1 and receiving the supply of gas and air at the lower end of the same.

Having thus described my invention, I claim and desire to secure by Letters Patent—

1. An oxidizing-furnace for producing pigments consisting of a rotating structure having an enlargement forming a pool for the molten metal and a portion below said pool down which the oxid is permitted to flow, and means for raising portions of the molten metal from said pool and pouring it back thereinto, in combination with means for heating said furnace, and for causing a flow of the oxidizing agent therethrough, substantially as specified.

2. An oxidizing-furnace for producing pigments consisting of a rotatable structure having an inclined axis and an enlarged portion forming a pool for the molten metal and a portion below said pool down which the oxid is permitted to flow, said enlarged portion of the furnace having means for lifting portions of the molten metal from the pool and pouring it back thereinto, in combination with means for heating the furnace and causing a flow of the oxidizing agent therethrough, substantially as specified.

3. An oxidizing-furnace for producing pigments consisting of a rotatable structure mounted on an inclined axis, and having an enlargement forming a pool for the molten metal, and a portion below said pool down which the oxid is permitted to flow, in combination with means for agitating the molten metal in the pool, and provision for heating the furnace, and for causing a flow of oxidizing agent therethrough, substantially as specified.

4. The combination in an oxidizing-furnace for producing pigments, of two rotatable structures mounted on inclined axes one above the other, and a flue structure connecting the same, the upper furnace having an enlarged portion forming a pool for the molten metal and a portion below said pool down which the oxid is permitted to flow and being provided with means for agitating the metal therein, in combination with means for heating the furnaces and causing a flow of the oxidizing agent therethrough, substantially as specified.

5. An oxidizing-furnace for producing pigments consisting of a rotatable structure mounted on an inclined axis, and having an enlarged portion forming a pool for the molten metal and a portion below said pool down which the oxid is permitted to flow, and provided with means for agitating the metal in said pool, in combination with means for supplying fresh metal to the pool, a discharging device for regulating the delivery of the oxid from the furnace, and means for heating the furnace and for causing a flow of the oxidizing agent therethrough, substantially as specified.

In testimony whereof I have signed my name to this specification in the presence of two subscribing witnesses.

JOHN W. H. JAMES.

Witnesses:
F. E. BECHTOLD,
JOS. H. KLEIN.